United States Patent
Heath et al.

(10) Patent No.: US 7,746,098 B2
(45) Date of Patent: Jun. 29, 2010

(54) TERMINATION SWITCHING BASED ON DATA RATE

(75) Inventors: Nicholas Heath, Apex, NC (US); Peter Mayer, Apex, NC (US)

(73) Assignee: Qimonda North America Corp., Cary, NC (US)

( * ) Notice: Subject to any disclaimer, the term of this patent is extended or adjusted under 35 U.S.C. 154(b) by 0 days.

(21) Appl. No.: 12/045,255

(22) Filed: Mar. 10, 2008

(65) Prior Publication Data

US 2009/0224796 A1    Sep. 10, 2009

(51) Int. Cl.
*H03K 17/16* (2006.01)
(52) U.S. Cl. .................... 326/30; 326/28; 365/189.05; 365/206; 365/233.13
(58) Field of Classification Search .................. 326/30, 326/82, 83, 86, 87
See application file for complete search history.

(56) References Cited

U.S. PATENT DOCUMENTS

| | | | | |
|---|---|---|---|---|
| 6,807,650 B2* | 10/2004 | Lamb et al. | ..................... | 716/1 |
| 2003/0206164 A1* | 11/2003 | Juenger | ....................... | 345/211 |
| 2003/0235107 A1* | 12/2003 | Jang | ............................ | 365/233 |
| 2004/0201402 A1* | 10/2004 | Rajan et al. | .................... | 326/30 |
| 2008/0183956 A1* | 7/2008 | Mayer et al. | ................ | 711/105 |

* cited by examiner

*Primary Examiner*—Rexford N Barnie
*Assistant Examiner*—Jany Tran
(74) *Attorney, Agent, or Firm*—Patterson & Sheridan, L.L.P.

(57) ABSTRACT

Embodiments of the invention are generally related to systems comprising devices connected by a bus. A device in the system may include termination control logic capable of detecting changes in the system clock frequency. Upon detecting a clock frequency, the termination control logic may determine whether the clock frequency is greater than a threshold frequency. If so, the termination control logic may enable bus termination. However, if the new clock frequency is lower than the threshold frequency, bus termination may be disabled, thereby conserving power.

25 Claims, 4 Drawing Sheets

TERMINATION SWITCHING BASED ON DATA RATE

BACKGROUND OF THE INVENTION

Modern electronic systems generally contain one or more devices that communicate with each other over a bus. For example, a computer generally comprises a processor or memory controller that communicates with a memory device over a bus to access programs and data contained in the memory device. The performance of modern electronic devices such as processors and memories continues to improve by operating the devices at higher clock speeds and/or widening the bus connecting the devices. Increasing clock speed and widening the bus, however, result in increased power consumption by the bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
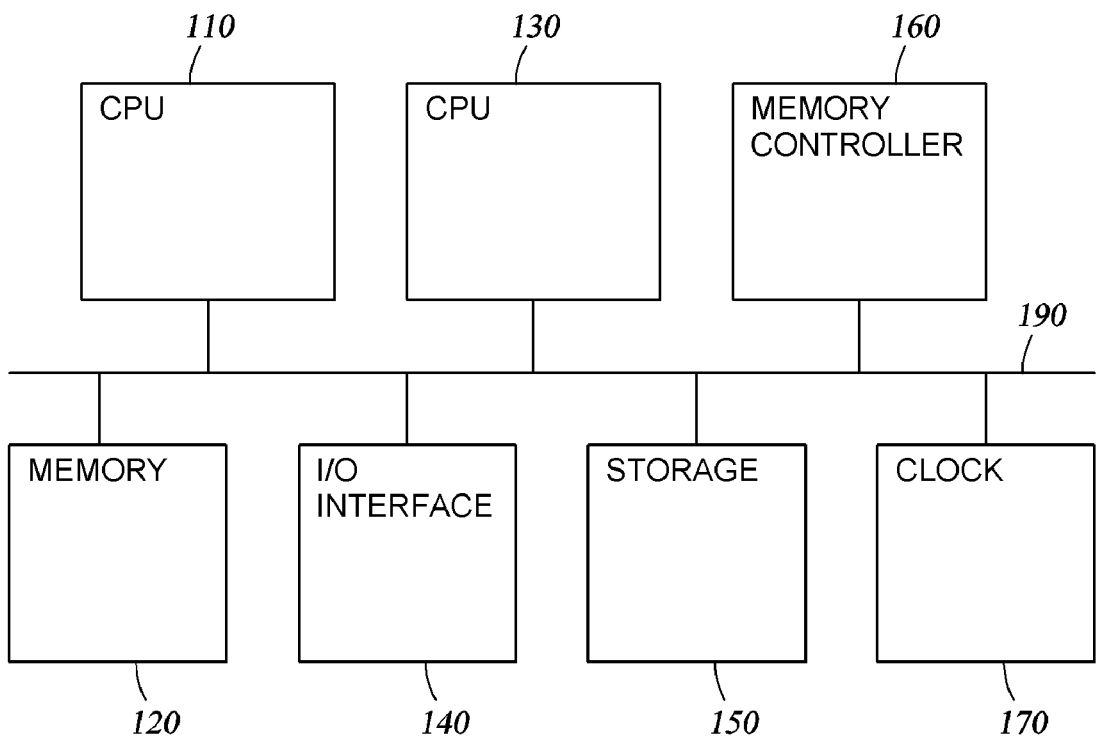
FIG. 1 illustrates an exemplary system according to an embodiment of the invention.

Embodiments of the invention are generally related systems comprising devices connected by a bus. A device in the system may include termination control logic capable of detecting changes in the system clock frequency. Upon detecting a new clock frequency, the termination control logic may determine whether the clock frequency is greater than a threshold frequency. If so, the termination control logic may enable bus termination. However, if the new clock frequency is lower than the threshold frequency, bus termination may be disabled, thereby conserving power.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Embodiments of the invention may generally be used with any type of memory. In one embodiment, the memory may be a circuit included on a device with other types of circuits. For example, the memory may be integrated into a processor device, memory controller device, or other type of integrated circuit device. Devices into which the memory is integrated may include system-on-a-chip (SOC) devices. In another embodiment, the memory may be provided as a memory device which is used with a separate memory controller device or processor device.

In both situations, where the memory is integrated into a device with other circuits and where the memory is provided as a separate device, the memory may be used as part of a larger computer system. The computer system may include a motherboard, central processor, memory controller, the memory, a hard drive, graphics processor, peripherals, and any other devices which may be found in a computer system. The computer system may be part of a personal computer, a server computer, or a smaller system such as an embedded system, personal digital assistant (PDA), or mobile phone.

In some cases, a device including the memory may be packaged together with other devices. Such packages may include any other types of devices, including other devices with the same type of memory, other devices with different types of memory, and/or other devices including processors and/or memory controllers. Also, in some cases, the memory may be included in a device mounted on a memory module. The memory module may include other devices including memories, a buffer chip device, and/or a controller chip device. The memory module may also be included in a larger system such as the systems described above.

In some cases, embodiments of the invention may be used with multiple types of memory or with a memory which is included on a device with multiple other types of memory. The memory types may include volatile memory and non-volatile memory. Volatile memories may include static random access memory (SRAM), pseudo-static random access memory (PSRAM), and dynamic random access memory (DRAM). DRAM types may include single data rate (SDR) DRAM, double data rate (DDR) DRAM, low power (LP) DDR DRAM, and any other types of DRAM. Nonvolatile memory types may include magnetic RAM (MRAM), flash memory, resistive RAM (RRAM), ferroelectric RAM (Fe-RAM), phase-change RAM (PRAM), electrically erasable programmable read-only memory (EEPROM), laser programmable fuses, electrically programmable fuses (e-fuses), and any other types of nonvolatile memory.

FIG. 1 illustrates an exemplary system 100 according to an embodiment of the invention. As illustrated, system 100 includes a central processing unit (CPU) 110, memory 120, graphics processing unit (GPU) 130, input/output (IO) interface 140, a storage device 150, memory controller 160, and a clock 170 interconnected by a bus 190.

CPU 110 may comprise one or more processor cores and one or more levels of cache memory. The one or more processor cores may be configured to execute instructions from a predetermined set of instructions. Each processor core may execute a sequence of instructions to perform one or more functions of the system, for example, text editing, displaying graphics, and the like. In one embodiment, the sequence of instructions may be performed in a pipelined manner to improve performance.

The memory 120 may be a random access memory, for example, a dynamic random access memory (DRAM), synchronous DRAM (SDRAM), double data rate synchronous DRAM (DDR SDRAM), static random access memory (SRAM), and the like, sufficiently large to hold the necessary programming and data structures operated on by CPU 110. While memory 120 is shown as a single entity, it should be understood that memory 120 may in fact comprise a plurality of modules, and that memory 120 may exist at multiple levels, for example, L2 cache, L3 cache, main memory, and the like.

Storage device 150 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 120 and storage 150 could be part of one virtual address space spanning multiple primary and secondary storage devices IO interface 140 may provide an interface between the processor and an input or output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 130 may be configured to receive graphics data, for example, 2-Dimensional and 3-Dimensional graphics data, from CPU 110, memory 120, and/or storage 150. In one embodiment, GPU 130 may perform one or more computations to manipulate the graphics data, and render images on a display screen using, for example, IO interface 140.

Memory controller 160 may be configured to manage the flow of data to and from memory 120 and/or the storage device 150. For example, memory controller 160 may be configured to receive data read and/or data write requests from one of the CPU 110, GPU 130, and/or IO interface 140. In response to receiving the requests, memory controller 160 may be configured to perform a read or write access to one of the memory 120 and/or storage device 150. While memory controller 160 is illustrated as a separate system device in FIG. 1, in alternative embodiments, memory controller 160 may be integrated with another device, for example, CPU 110.

Data may be exchanged between the various system devices, for example, between memory controller 160 and memory 120, over the bus 190. While the devices of system 100 are shown connected by a single bus 190, in alternative embodiments, one or more busses may be provided to connect one or more of the system devices. For example, in one embodiment, a first bus may connect CPU 110 to the memory controller 160, and a second bus may connect the memory controller to the memory 120.

Bus 190 may include a plurality of parallel conductive lines for transferring a plurality of bits of data. In one embodiment, the bus 190 may include a control bus, address bus and/or a data bus (not shown in FIG. 1). A control bus may be used to exchange control signals, for example, write enable, chip select, data available, and the like. The address bus may be configured to transfer an address representing a memory location for storing or retrieving data. The data bus may be configured to transfer data to and from identified memory locations. In one embodiment of the invention, one or more conductive lines of memory bus 190 may be configured to transfer control bits, address bits and/or data bits.

In one embodiment, system 100 may be a synchronous system. Accordingly, system 100 may comprise a clock 170 to generate a clock signal for the devices of system 100. The devices of system 100 may transfer and/or receive data from the bus 190 at a clock edge of the clock signal or another signal derived from the clock signal. In a particular embodiment, clock 170 may be a crystal oscillator. The clock signal generated by clock 170 may have a predetermined clock frequency. In one embodiment of the invention, one or more system devices, for example, processor 110, memory 120, GPU 130, and the like, may be configured to alter the frequency of the clock signal received from the clock 170. In alternative embodiments, the clock 170 may be configured to generate clock signals of different frequencies.

To improve system performance, the data transfer rates between system devices has been steadily increasing over the years. The increased data transfer rates have been achieved, in many cases, by operating system devices at higher clock frequencies. For example, the frequency of the clock signal generated by clock 170 may be increased. By increasing the clock frequency, data may be transferred faster on the bus 190, thereby improving performance.

However, increasing clock frequency results in greater power consumption on the bus 190. Accordingly, in some cases, the devices may be configured to operate at one or more clock frequencies based on a nature of a task being performed. For example, while performing performance critical operations such as rendering 3-Dimensional (3D) images, playing video, computing graphics data, and the like, a processing device such as the processor 110 or GPU 130 may be configured to operate at a relatively higher clock frequency. On the other hand, while performing operations that are not performance critical, for example, text editing, the processing device may be configured to operate at a relatively lower frequency.

In one embodiment, the clock adjusting devices may include clock adjusting circuitry such as, for example, a phase locked loop (PLL) or a delay locked loop (DLL) to generate different clock frequencies based on an input clock signal received from the clock 170. Alternatively, the clock 170 may be configured to generate a clock signal having an appropriate frequency based on a task being performed. Adjusting the clock to lower frequencies while performing tasks that are not performance critical may be especially beneficial in mobile systems where a battery provides power to the system. By conserving power in such systems, battery life may be enhanced.

Another concern with increasing clock frequency is that, at high clock frequencies, the impedance of the conductive lines of the bus 191 may cause signals on the bus to be reflected, thereby resulting in erroneous transmissions. The reflection of signals on a conductive line may be prevented by including a termination circuit in each device to terminate one or more of the conductive lines. The termination circuit may include components that match the impedance of a respective one or more conductive lines, thereby preventing the reflection of signals.

Figure 2:
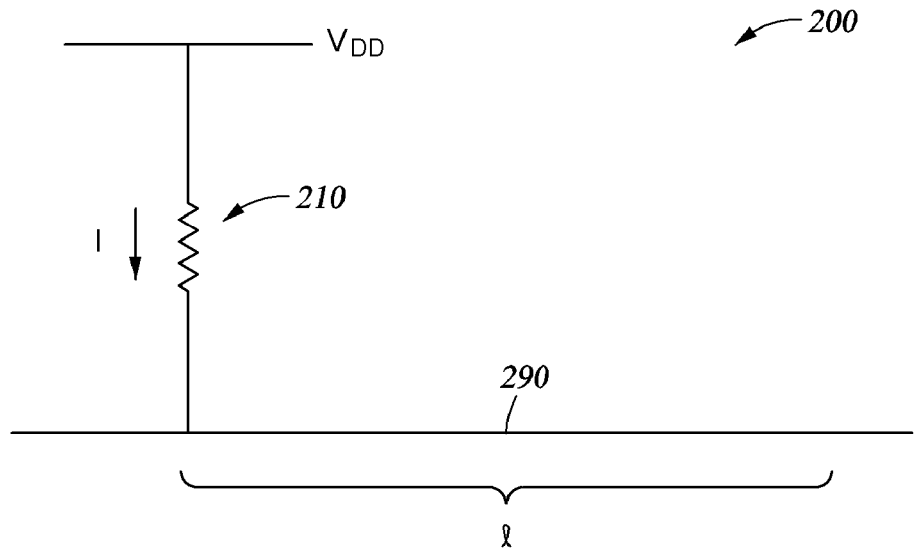
FIG. 2 illustrates an exemplary termination circuit according to an embodiment of the invention.

FIG. 2 illustrates an exemplary termination circuit 200 according to an embodiment of the invention. For purposes of simplicity, the termination circuit 200 is shown comprising a resistor 210 connected to a conductive line 290 at one end, and a reference voltage $V_{DD}$ at a second end. The impedance of the resistor 210 may match an impedance of a portion of the conductive line 290, for example, the impedance of conductive line 290 along the length I. While the termination circuit 200 is shown having a resistor, in alternative embodiments, any number and types of elements, for example, resistors, capacitors, inductors, and the like, connected in series and/or parallel may be used to form a termination circuit.

Although termination circuits may prevent or reduce signal reflection on a system bus, the termination circuits may result in increased power consumption. For example, while driving a value on the conductive line 290, the voltage driven on the conductive line may be lower than the reference voltage VDD. Accordingly, a current I may flow through the resistor 210 due to the potential difference across the resistor 210 terminals. The current flow through termination circuit may result in increased power consumption.

Embodiments of the invention provide methods, systems, and articles of manufacture that allow selective enablement and disablement of termination circuits of one or more conductive lines of a bus based on a clock frequency for data transfer on the one or more conductive lines. For example, at high clock frequencies, the probability of signal reflection on the conductive lines may be greater. Therefore, the termination circuit or circuits associated with the respective one or more conductive lines may be enabled. On the other hand, at lower clock frequencies, the probability of signal reflection may be low. Therefore, the termination circuit or circuits associated with the respective one or more conductive lines may be disabled, thereby conserving power.

Figure 3:
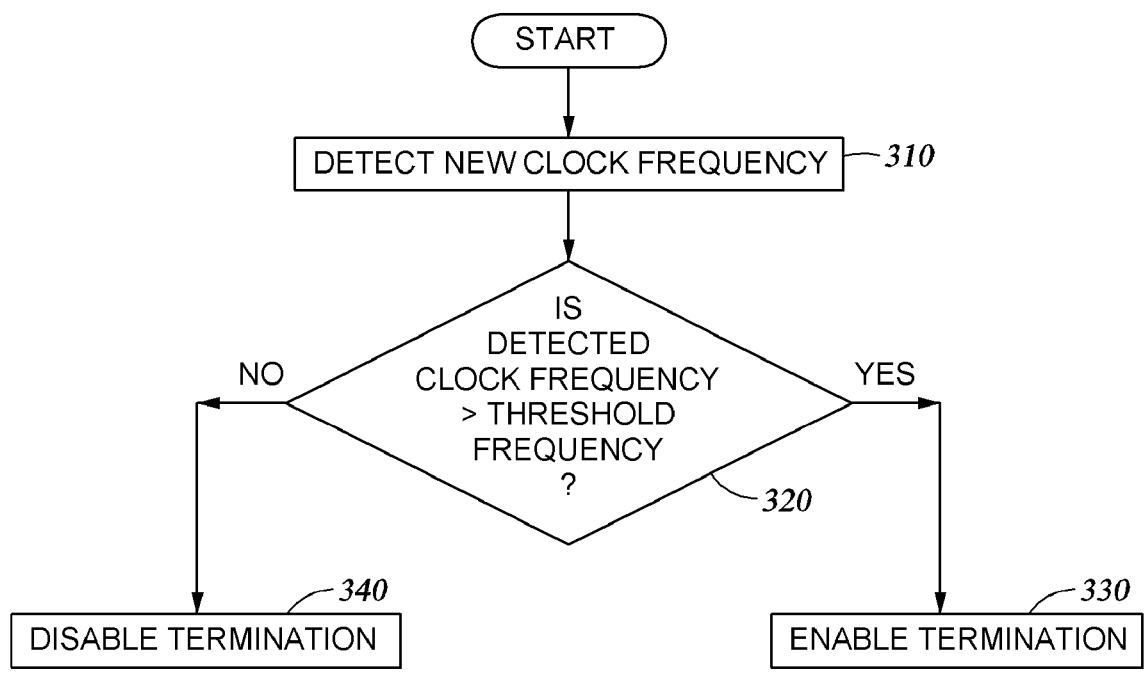
FIG. 3 is a flow diagram of exemplary operations performed by termination control logic, according to an embodiment of the invention.

In some embodiments, one or more devices of a system may include termination control logic circuitry to selectively enable or disable the termination circuits. FIG. 3 illustrates exemplary operations that may be performed by the termination control logic, according to an embodiment of the invention. The operations begin in step 310 by detecting a new clock frequency. For example, while performing a performance critical task, the clock frequency may be switched to a higher clock frequency. The termination control logic may detect the new clock frequency after the switch to a higher clock frequency.

In step 302, the termination control logic may determine whether the new clock frequency is greater than a threshold frequency. The threshold frequency may be a frequency at which errors caused by signal reflection are unacceptably high. In one embodiment of the invention, the threshold clock frequency may be at or near 400 MHz. If the new clock frequency is greater than the threshold clock frequency, the termination control logic may enable one or more termination circuits for one or more conductive lines of a bus in step 330. On the other hand, if the new clock frequency is lower than the threshold clock frequency, one or more termination control circuits for one or more conductive lines of the bus may be disabled.

Figure 4:
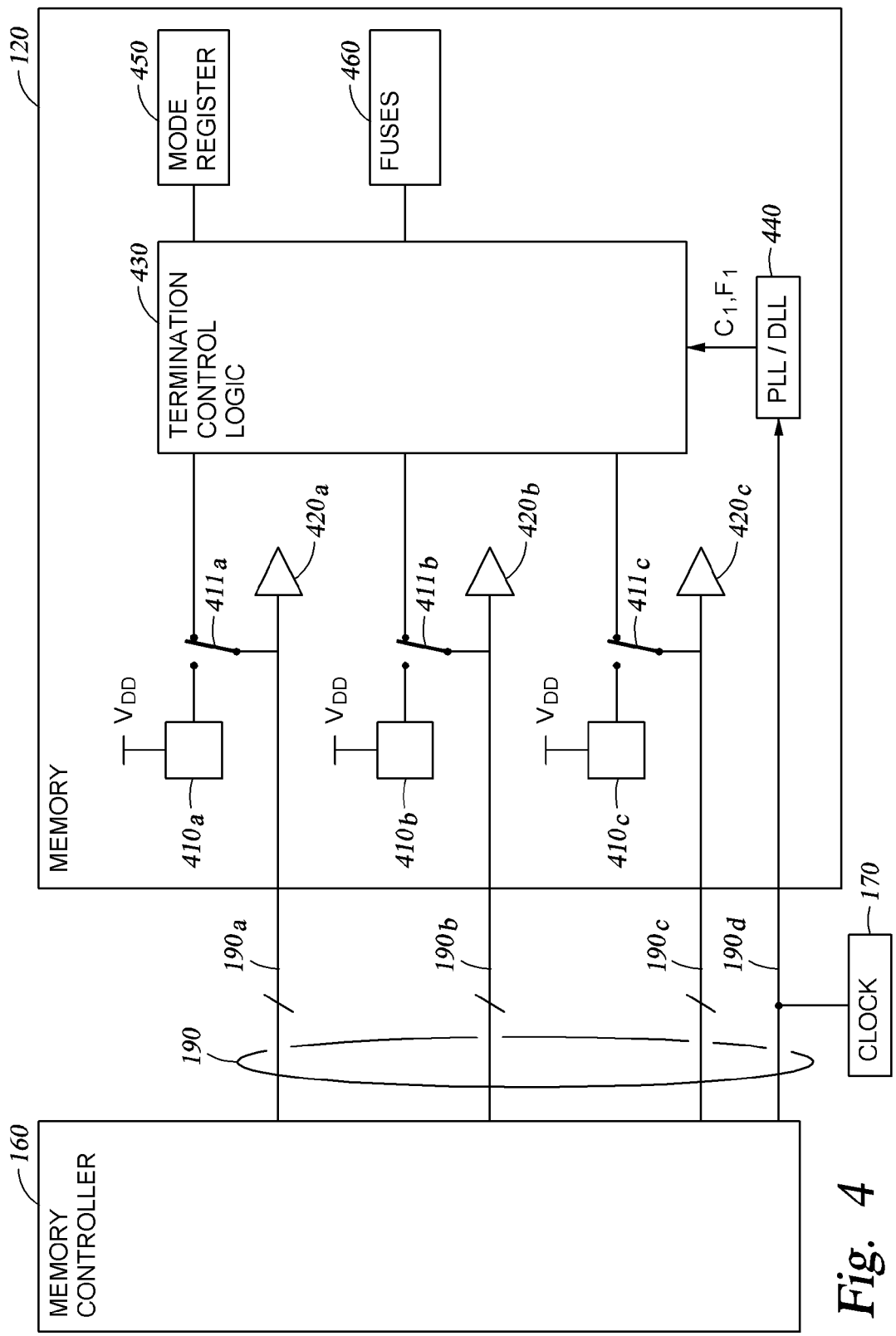
FIG. 4 illustrates a more detailed view of an exemplary memory device according to an embodiment of the invention.

FIG. 4 illustrates a more detailed view of the bus 190 and components of memory 120 configured to facilitate selective enablement and disablement of termination circuits. While a memory 120 and a memory controller 160 are shown connected by the bus 190 in FIG. 4, embodiments of the invention are not limited to memory controllers and memories. More generally embodiments of the invention may be incorporated in any system device.

As illustrated in FIG. 4, in one embodiment, the conductive lines of the bus 190 may include one or more distinct groups of conductive lines such as conductive lines 190a, 190b, and 190c. The bus 190 may also include a conductive line 190d for transferring a clock signal from the clock 170 to the memory controller 160 and the memory 120, as illustrated in FIG. 4.

In one embodiment of the invention, the groups of conductive lines 190a-190c may be distinguished based on a data transfer rate on the respective conductive lines of each group. For example, the lines 190a may be single data rate (SDR) conductive lines, the lines 190b may be double data rate (DDR) conductive lines, and the lines 190c may be quadruple data rate conductive lines. In a particular embodiment, command bits may be transferred over the SDR lines 190a, address bits may be transferred on the DDR lines 190b, and data bits may be transferred on the QDR lines 190c.

Each of the conductive lines 190a, 190b, and 190c may be coupled with a respective input driver circuit 420a-420c, as illustrated in FIG. 4. The input driver circuits 420a-420c may be configured to capture data on the bus 190. Data may be captured on the SDR lines at a clock edge of a clock signal, for example, the clock signal generated by clock 170, or a signal derived from the clock signal. For example, in one embodiment, data on the conductive lines 190a may be captured by the input driver circuit 420a at a rising edge of the clock signal. Alternatively, data may be captured at a falling edge of the clock signal.

The input driver circuit 420b may be configured to capture data on the conductive lines 190b at the rising edge and the falling edge of the clock signal, thereby doubling the data transfer rate. For example, a first bit on a conductive line 190b may be captured at the rising edge of the clock signal, and a second bit may be captured at the falling edge of the clock signal.

In one embodiment of invention, clock 170 may be configured to transfer two clock signals on respective conductive lines 190d. The two clock signals may be 90° out of phase from each other. The input driver circuit 420c may be configured to capture data at the rising and falling edges of both clock signals, thereby quadrupling the data transfer rate.

While data transfers at SDR, DDR, and QDR are disclosed herein, in alternative embodiments, any combination of SDR, DDR, and QDR conductive lines may be implemented. For example, in some embodiments, data bus 190 may include only DDR and QDR conductive lines. Furthermore, embodiments of the invention are not limited to SDR, DDR, and QDR. Rather, any rate of data may be used on the conductive lines to transfer command, address, data, or other bits.

Different data rates may be implemented on different data lines for a variety of reasons. In one embodiment, a relatively higher data rate may be implemented in the address lines to reduce the pin count for the address lines (or any other type of lines), thereby reducing complexity. For example, if 14 address lines are required to transfer an address bits on SDR conductive lines, the same address bits may be transferred in the same amount of time on 7 DDR conductive lines. In some embodiments, command lines may not operate at the same data rate as conductive lines for data because of latencies that may exist between receiving a command and providing data on the data lines in response to the command. In other words, because a next command may not be issued until data is retrieved from a device, it may not be necessary to operate the command lines at a high data rate. On the other hand, data lines may be operated at greater data rates to reduce the latency for retrieving data.

The conductive lines 190a, 190b, and 190c may also be connected to a respective termination circuit 410a-410c, as illustrated in FIG. 4. Termination circuits 410a-410c may correspond to the termination circuit 200 illustrated in FIG. 2, and accordingly, may include, for example, resistors, capacitors, inductors, and the like. Further, as illustrated in FIG. 4, switches 411a-411c may either connect or disconnect respective termination circuits 410a-410c to the conductive lines 190a-190c. In one embodiment, the switches 411a-411c may be transistors, for example, a p-channel metal-oxide semiconductor (PMOS), n-channel metal-oxide semiconductor (NMOS), complementary metal-oxide semiconductor (CMOS), a bipolar junction transistor, or the like. The switches 411a-411c may be controlled by a termination control logic circuit 430, as will be described below.

The clock signal on the conductive line 190d may be received by a clock adjusting device 440 of the memory 120. Clock adjusting device 440 may be configured to receive a clock signal $C_0$ having a frequency $f_0$, as illustrated in FIG. 4. Clock adjusting devices may be configured to adjust the clock signal $C_0$ to maintain a fixed relationship between the clock signal $C_0$ and one or more other signals, for example, a data signal received via bus 190. For example, as illustrated in FIG. 4, clock adjusting device 440 receives the clock signal $C_0$ and outputs an adjusted clock signal $C_1$. Adjusted clock signal $C_1$ may have a fixed relationship to another signal for example, a data signal received via bus 190. In one embodiment of the invention, the clock adjusting device 440 may be a Phase Locked Loop (PLL). In alternative embodiments, the device 440 may be delay locked loop (DLL).

In one embodiment, clock signal $C_1$ may have a fixed relation to the phase of the clock signal $C_0$. In other words, clock signal $C_1$ may be derived by shifting the phase of the received clock signal $C_0$. In another embodiment, altering the clock signal $C_0$ to generate a new clock signal $C_1$ may be performed to stabilize and/or adjust the received clock signal $C_0$ and/or the clock frequency $f_0$, thereby eliminating noise in the input clock signal $C_0$, skewing and transmission delays in the input clock signal $C_0$, and the like.

In some embodiments, the frequency $f_1$ of clock signal $C_1$ may be the same as the frequency of the clock signal $C_0$. However, in other embodiments, the frequency of the clock signal $C_1$ may not be the same as the frequency of the clock signal $C_0$. For example, in a particular embodiment, the frequency of the clock signal $C_1$ may be derived by multiplying the clock signal $C_0$ by a predetermined multiple.

In one embodiment of the invention, termination control logic 430 may be configured to detect the frequency $f_1$ of clock signal $C_1$ and either connect or disconnect the termination circuits 410a-410c to respective conductive lines 190a-190c. In other words, termination control logic 430 may be configured to perform the steps illustrated in FIG. 3. For example, termination control logic 430 may be configured to determine whether the clock frequency $f_1$ is greater than a threshold frequency. If the frequency f1 is greater than the threshold frequency, termination control logic 430 may disable bus termination by disconnecting the termination circuits 410a-410c from their respective conductive lines 190a-190c. In one embodiment, termination circuits 410a-410c may be disconnected by opening switches 411a-411c.

In one embodiment of the invention, the threshold frequency for enabling or disabling bus termination may depend on the data rate on a particular conductive line. For example, the threshold frequency for SDR, DDR, and QDR data lines may be different. Accordingly, in one embodiment, termination control logic 430 may be configured to separately determine whether termination should be enabled or disabled for different sets of conductive lines. For example, termination control logic 430 may be configured to separately determine whether to enable or disable bus termination for conductive lines 190a, 190b, and 190c.

In one embodiment, memory 120 may include a mode register 450 for storing information related to termination control of bus 190. For example, mode register 450 may include the threshold frequency to facilitate determining enablement or disablement of termination for conductive lines 190a-190c. Therefore, the termination control logic 430 may be configured to access the mode register upon detecting a change in clock frequency, compare a new clock frequency to the threshold frequency stored in the mode register, and based on the comparison, enable or disable termination circuits.

In some embodiments, mode register 450 may include one or more bits that control the switches 411a-411c. In other words, the one or more bits may determine whether termination is enabled or disabled for each of the conductive lines 190a-190c. In one embodiment, the one or more bits may be set by the memory controller 160, for example, during system startup, restart, interrupt, and the like. In one embodiment, the termination control logic 430 may be configured to read the one or more bits in the mode register, and enable or disable termination circuits according to the one or more bits.

In one embodiment, the mode register may include one or more bits for setting one or more values associated with a termination circuit. For example, in one embodiment, the one or more bits of the mode register may determine a value of the resistor 210 illustrated in FIG. 2. The memory controller, or alternatively, the termination control logic 430 may be configured to set the values of the one or more bits, and therefore, set the value of the resistor. In one embodiment, setting the value of the resistor may be performed to facilitate impedance matching that reduces reflection of signals on the bus 190.

Memory 120 may also include fuses 460. The fuses may be, for example, e-fuses, laser fuses, or the like, according to an embodiment of the invention. In one embodiment, the fuses 460 may control the switches 411a-411c, thereby either enabling or disabling termination on the conductive lines 190a-190c. For example, the termination control logic 430 may be configured to read the fuses at, for example, system startup, restart, interrupt, and the like. Based on the values stored in the fuses, termination control logic 430 may enable or disable one or more termination circuits. In one embodiment, the fuses may be set, for example, during testing of the memory 120. In some embodiments, the fuses 460 may include one or more bits to set a value associated with a termination circuit, for example, a value of a resistor 210, as discussed above.

Figure 5:
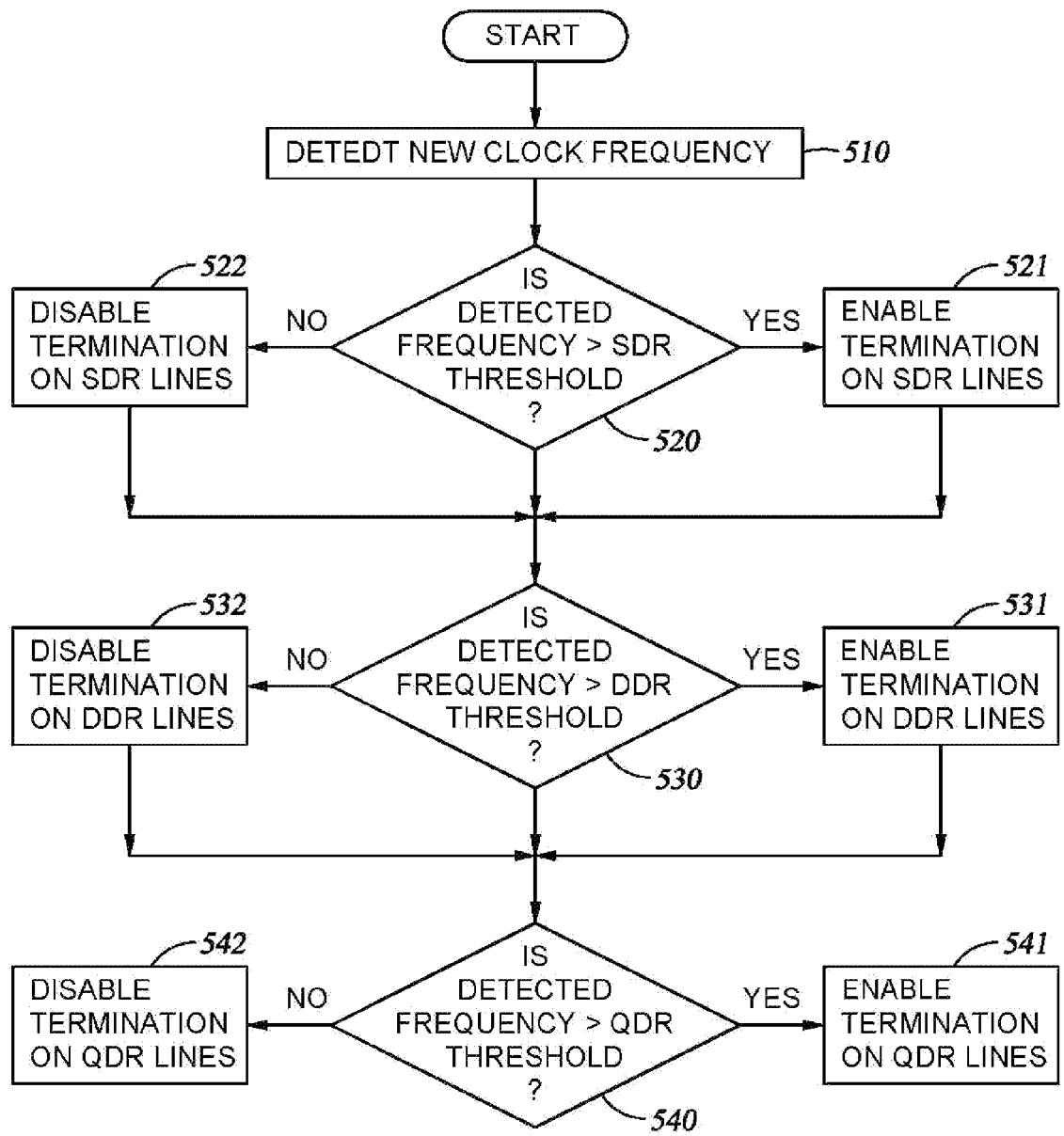
FIG. 5 is a flow diagram of exemplary operations performed by termination control logic to selectively enable and disable bus termination based on data rate and clock frequency, according to an embodiment of the invention.

FIG. 5 is a flow diagram of exemplary operations performed by the termination control logic 430 to enable or disable bus termination based on data rate and frequency. The operations may begin in step 510 by detecting a new clock frequency, for example, frequency $f_1$ of clock signal $C_1$, illustrated in FIG. 4. The clock frequency may be changed for a variety of reasons, for example, based on a task being performed by the system, to conserve energy, and the like.

In step 520, termination control logic 430 may determine whether the detected clock frequency is greater than a threshold frequency for SDR conductive lines. If the detected frequency is greater than the threshold frequency for SDR conductive lines, termination control logic 430 may enable bus termination on the conductive lines 190a, in step 521. In one embodiment, enabling termination on the conductive lines 190a may involve closing the switch 411a. If the detected frequency is less than the threshold frequency for SDR conductive lines, termination control logic 430 may disable bus termination on the conductive lines 190a, in step 522. In one embodiment, disabling termination on the conductive lines 190a may involve opening the switch 411a. If the detected clock frequency is the same as the threshold frequency, termination control logic 430 may either enable or disable termination on the conductive lines 190a.

In step 530, termination control logic 430 may determine whether the detected clock frequency is greater than a threshold frequency for DDR conductive lines. If the detected frequency is greater than the threshold frequency for DDR conductive lines, termination control logic 430 may enable bus termination on the conductive lines 190b, in step 531. In one embodiment, enabling termination on the conductive lines 190b may involve closing the switch 411b. If the detected frequency is less than the threshold frequency for DDR conductive lines, termination control logic 430 may disable bus termination on the conductive lines 190b. In one embodiment, disabling termination on the conductive lines 190b may involve opening the switch 411b. If the detected clock frequency is the same as the threshold frequency, termination control logic 430 may either enable or disable termination on the conductive lines 190b.

In step 540, termination control logic 430 may determine whether the detected clock frequency is greater than a threshold frequency for QDR conductive lines. If the detected frequency is greater than the threshold frequency for QDR conductive lines, termination control logic 430 may enable bus termination on the conductive lines 190c, in step 541. In one embodiment, enabling termination on the conductive lines 190c may involve closing the switch 411c. If the detected frequency is less than the threshold frequency for QDR conductive lines, termination control logic 430 may disable bus termination on the conductive lines 190c. In one embodiment, disabling termination on the conductive lines 190c may involve opening the switch 411c. If the detected clock frequency is the same as the threshold frequency, termination control logic 430 may either enable or disable termination on the conductive lines 190c.

In an alternative embodiment, the termination control logic 430 may first determine if a detected frequency is less than a smallest frequency threshold for the conductive lines of the bus. If the detected frequency is less than the smallest threshold frequency, all the termination circuits may be disabled. Alternatively, the termination control logic 430 may determine whether a detected frequency is greater than the greatest frequency threshold for the conductive lines of the bus. If the detected frequency is greater than the greatest frequency, all termination control circuits may be enabled.

In some embodiments, the termination control logic 430 may be configured to operate in a "don't care" state. For example, in the "don't care" state", the termination control logic 430 may be configured to either enable or disable all or some of the termination circuits regardless of a detected clock frequency. The termination control logic 430 may be configured to operate in a "don't care" state, for example, during testing of a device, in one embodiment of the invention. In one embodiment, the mode register 450 may contain one or more bits that determine whether the termination control logic 430 operates in a "don't care" state, or an "active state" wherein the termination control logic detects changes in clock frequency and enables/disables termination circuits based on the detected changes, as described above. In one embodiment, the state of the termination control logic 430, whether "active" or "don't care" may be set by a memory controller by, for example, updating the mode register 450.

While a termination circuit coupled with a group of conductive lines transferring data at a given data rate is disclosed herein, in alternative embodiments, any number of termination circuits may included. For example, a termination circuit may be included for each conductive line, or a plurality of conductive lines irrespective of the rate of data transfer on the conductive lines. Furthermore, embodiments of the invention are not limited to memory devices. Rather, embodiments of the invention may be incorporated into any device connected to a bus.

By allowing bus termination to be selectively enabled and disabled based on the clock frequency, embodiments of the invention facilitate conservation of power. While the foregoing is directed to embodiments of the present invention, other and further embodiments of the invention may be devised without departing from the basic scope thereof, and the scope thereof is determined by the claims that follow.

What is claimed is:

1. A method for operating a system comprising a plurality of devices connected by a bus, comprising:
   detecting a change from a first clock frequency to a second clock frequency by a device connected to the bus;
   in response to detecting the second clock frequency, determining whether the second clock frequency is greater than a threshold frequency;
   upon determining that the second clock frequency is greater than the threshold frequency, enabling termination of the bus at the device; and
   upon determining that the second clock frequency is less than the threshold frequency, disabling termination of the bus at the device.

2. The method of claim 1, further comprising, enabling termination upon determining that the second clock frequency is equal to the threshold frequency.

3. The method of claim 1, further comprising, disabling termination upon determining that the second clock frequency is equal to the threshold frequency.

4. The method of claim 1, wherein the bus comprises any combination of single data rate (SDR), double data rate (DDR), and quadruple data rate (QDR) lines.

5. The method of claim 4, wherein the threshold frequency for one or more conductive lines of the bus is based on the data rate on the one or more conductive lines.

6. The method of claim 1, wherein the bus comprises address lines, data lines, and command lines.

7. A device coupled to a bus, comprising
   at least one termination circuit, wherein the termination circuit is configured to prevent reflection of signals on one or more conductive lines of the bus;
   a switch coupled with each termination circuit and the respective one or more conductive lines of the bus, wherein the switch is configured to either connect or disconnect the termination circuit from the one or more conductive lines; and
   termination control logic circuitry configured to:
      detect a change from a first clock frequency to a second clock frequency;
      in response to detecting the second clock frequency, determine whether the second clock frequency is greater than a threshold frequency;
      upon determining that the second clock frequency is greater than the threshold frequency, close the switch to connect the termination circuit to the one or more conductive lines; and
      upon determining that the second clock frequency is less than the threshold frequency, open the switch to disconnect the termination circuit from the one or more conductive lines.

8. The device of claim 7, wherein the one or more conductive lines are one of SDR conductive lines, DDR conductive lines, and QRD conductive lines.

9. The device of claim 7, wherein the one or more conductive lines are one of address lines, data lines, and command lines.

10. The device of claim 7, wherein the device is a memory device.

11. The device of claim 7, wherein the termination circuit comprises any combination of resistors, capacitors, and inductors.

12. A system, comprising a clock configured to generate a clock signal and a plurality of devices connected to a bus, wherein at least one device comprises:
   at least one termination circuit, wherein the termination circuit is configured to prevent reflection of signals on one or more conductive lines of the bus;
   a switch coupled with each termination circuit and the respective one or more conductive lines of the bus, wherein the switch is configured to either connect or disconnect the termination circuit from the one or more conductive lines; and
   termination control logic circuitry configured to:
      detect a change from a first clock frequency to a second clock frequency;
      in response to detecting the second clock frequency, determine whether the second clock frequency is greater than a threshold frequency;
      upon determining that the second clock frequency is greater than the threshold frequency, close the switch to connect the termination circuit to the one or more conductive lines; and
      upon determining that the second clock frequency is less than the threshold frequency, open the switch to disconnect the termination circuit from the one or more conductive lines.

13. The system of claim 12, wherein the one or more conductive lines are one of SDR conductive lines, DDR conductive lines, and QRD conductive lines.

14. The system of claim 12, wherein the one or more conductive lines are one of address lines, command lines, and data lines.

15. The system of claim 12, wherein the device is a memory device.

16. The system of claim 12, wherein the termination circuit comprises any combination of resistors, capacitors, and inductors.

17. A method for operating a system comprising a plurality of devices connected by a bus comprises at least one or more first conductive lines configured to transfer data at a first data rate and one or more second conductive lines configured to transfer data at a second rate, the method comprising:
   determining whether a clock frequency is greater than a first threshold frequency;
   upon determining that the clock frequency is greater than the first threshold frequency, enabling termination for the one or more first conductive lines;
   upon determining that the clock frequency is less than the first threshold frequency, disabling termination for the one or more first conductive lines;
   determining whether the clock frequency is greater than a second threshold frequency;
   upon determining that the clock frequency is greater than the second threshold frequency, enabling termination for the one or more second conductive lines; and
   upon determining that the clock frequency is less than the second threshold frequency, disabling termination for the one or more second conductive lines.

18. The method of claim 17, wherein the one or more first conductive lines and the one or more second conductive lines are one of SDR conductive lines, DDR conductive lines, and QRD conductive lines.

19. The method of claim 17, wherein the one or more first conductive lines and the one or more second conductive lines are one of address lines, command lines, and data lines.

20. The method of claim 17, wherein the device is a memory device.

21. The method of claim 17, wherein the termination circuit comprises any combination of resistors, capacitors, and inductors.

22. A method for conserving power in a device connected to a bus comprising:
   enabling termination of the bus at the device when a frequency of a clock signal received by the device is greater than a threshold frequency; and
   disabling termination of the bus the device when the frequency of the clock signal received by the device is less than the threshold frequency, wherein disabling termination reduces power consumption by the device.

23. The method of claim 22, wherein the bus comprises SDR conductive lines, DDR conductive lines, and QRD conductive lines.

24. The method of claim 22, wherein the bus comprises address lines, command lines, and data lines.

25. The system of claim 22, wherein the device is a memory device.

* * * * *